Feb. 23, 1932. T. L. HEDGPETH 1,846,641
RADIAL SAW ARM
Filed Feb. 3, 1930 3 Sheets-Sheet 1

INVENTOR
Theron L. Hedgpeth
BY
ATTORNEY

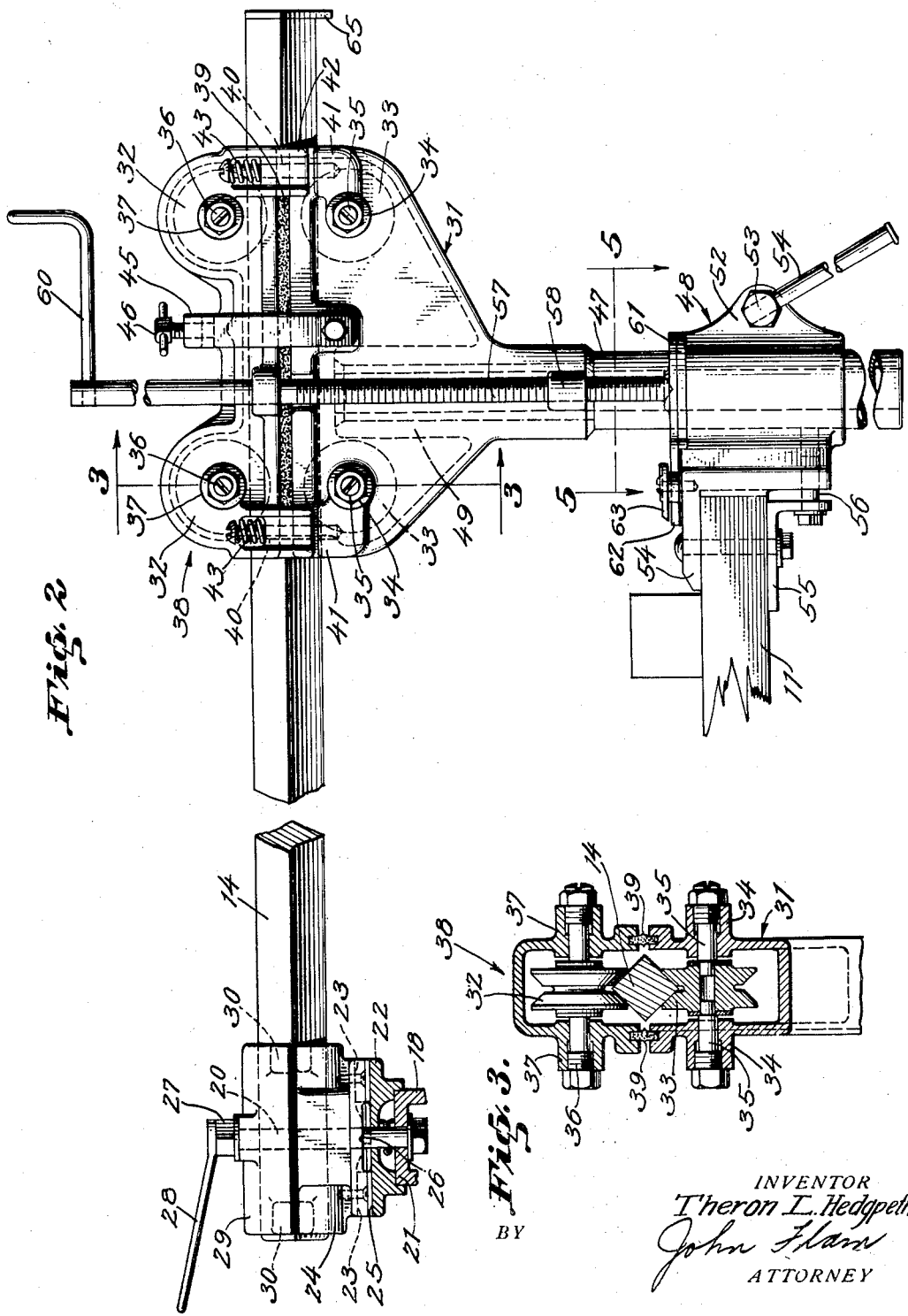

Feb. 23, 1932.　　T. L. HEDGPETH　　1,846,641
RADIAL SAW ARM
Filed Feb. 3, 1930　　3 Sheets-Sheet 3
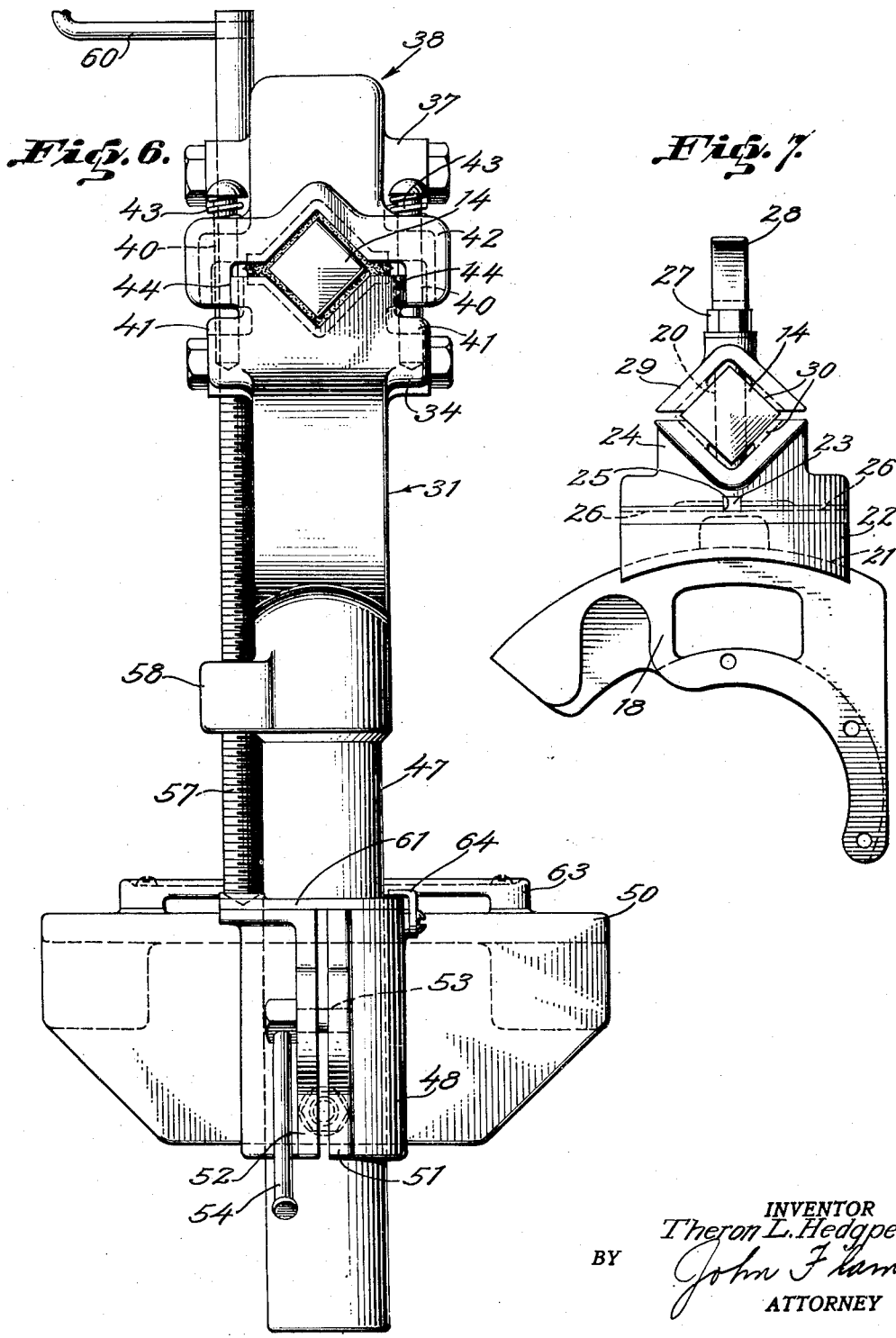
INVENTOR
Theron L. Hedgpeth
BY John F Lam
ATTORNEY Patented Feb. 23, 1932

1,846,641

UNITED STATES PATENT OFFICE

THERON L. HEDGPETH, OF WARSAW, INDIANA, ASSIGNOR OF ONE-HALF TO NELSON M. BARNHART, OF OAKLAND, CALIFORNIA

RADIAL SAW ARM

Application filed February 3, 1930. Serial No. 425,464.

This invention relates to a supporting arm for a portable power saw; and especially to an arm that is adjusted to enable the power driven saw to operate either as a cross-cut or a rip saw, as well as to produce angle cuts.

In general, my present invention is in the nature of an improvement over the device shown in my copending application, Serial No. 279,703, filed May 22, 1928, for "Adjustable support for power saws."

It is one of the objects of my present invention to provide a saw support that is simple to construct, and is yet sturdy and capable of hard use.

It is now well known that a power driven saw can be adjustably supported on an arm. The arm itself is arranged to swing on a vertical standard. In the past it has been common to support the saw structure slidably on the arm. This involves a sliding saw structure that requires considerable bulk, due to the mechanism required, near the saw itself. This may interfere with the ease of its use. It is another object of my invention to provide an arm on which the saw is supported by being permanently attached thereto, the arm length, however, being adjustable in a standard. Thus the adjustable support is shifted to the standard, away from the saw, where additional bulk or weight or mechanism in no way interferes with the free use of the saw.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Fig. 2 is a side elevation of the radial arm, some of the elements being broken away to reduce the size of the figure;

Fig. 3 is a sectional view taken along plane 3—3 of Fig. 2;

Fig. 6 is an end view of the radial arm; and

Fig. 7 is an end view of the arm taken in the opposite direction to that of Fig. 6, and with the saw removed.

Figure 1:
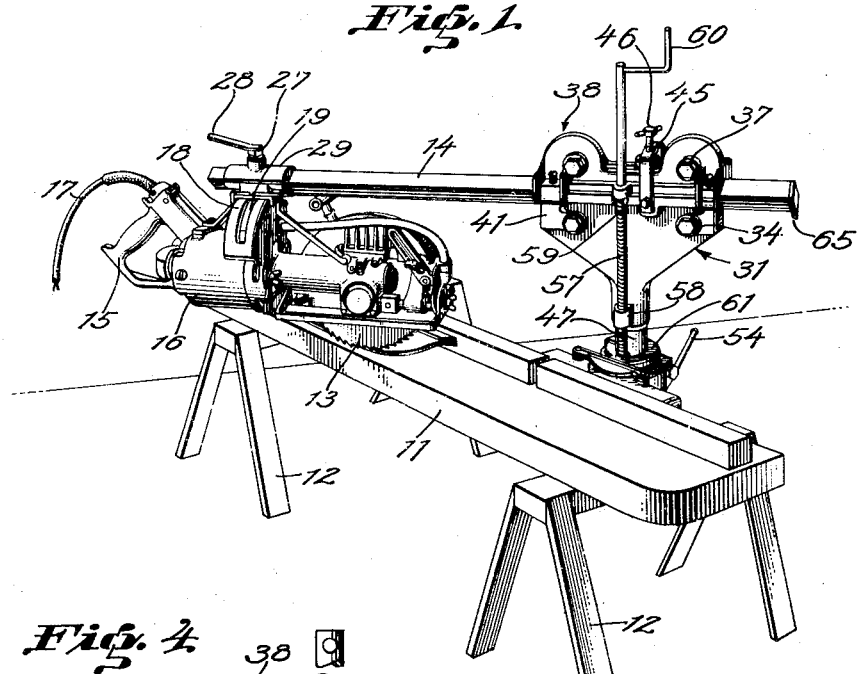
Figure 1 is a perspective view of a radial saw arm embodying my invention shown as used in connection with a power driven saw and a work bench.

In Fig. 1, I show in diagrammatic form, a work table or bench 11, supported as on stands 12. A power driven saw 13 is shown as supported above the table on an arm 14. The manner in which this arm is supported and adjusted will be hereinafter described.

The saw 13 is indicated as having a hand grip 15, as well as a small electric motor 16 to which current can be fed, as by the leads 17. In general, the saw structure proper is arranged substantially as in my prior application hereinbefore referred to. It includes a sector 18 having an elongated slot 19, by the aid of which the angular position of the saw 13 can be adjusted with respect to the axis of sector 18. This sector is shown in greater detail in Fig. 7.

Referring particularly to Figs. 2 and 7, it is seen that the sector 18 is held against an arcuate shoulder 21 on the bottom of a head 22. This head can be turned so as to position saw 13 at will in a position shown or in one such that plane is perpendicular to arm 14. At its upper surface, this head therefore carries a pair of cross slots 26, 26 arranged to cooperate with a key 23 fastened to the bottom of a standard 24. Thus it is possible for either of the two cross slots 25 or 26 to be engaged with the key 23 by turning the head 22 to the proper angular position with respect to the axis of a bolt 20. Thus the position of the saw 13 can be that shown in Fig. 1, or alternately it can be made so that its plane is perpendicular to the axis of radial arm 14.

The bolt 20 extends through an opening in the end of the arm 14, and at its top it can be provided with a nut 27 having handle 28. In this way, it is possible to clamp together the sector 18, the head 22, the standard 24, and a cap 29. The standard 24 and the cap 29 are provided with spacing bosses 30 (Fig. 7) that contact with the diagonal faces of the arm 14, when the nut 20 is tightened.

It is thus apparent that the saw support including the standard 24 and the cap 29 maintains the saw structure rigidly in position near the end of arm 14. This arm, however, is capable of adjustment along its longitudinal axis in a standard structure 31—38. The details of this standard are shown most clearly in Figs. 2 and 3. The arm 14 is shown as square and as set in the diagonal position indicated. The guide rollers 32, 33 contact over an extensive area, with the top and bottom faces respectively of this arm, and keep it steady against side motion. There are two sets of top and bottom rollers, as shown clearly in Fig. 2, the axis of the sets being spaced apart by a horizontal distance sufficiently large to provide a long and true guide for the arm 14. The lower part 31 of the standard is shown as hollow, and is provided with a pair of bosses 34 at each side. Into it can be screwed the bearing pins 35 for the lower rollers 33.

The upper rollers 32 are similarly supported on screws 36 arranged in the bosses 37 on the upper half 38 of the standard 31.

This upper half 38 is urged resiliently downwardly toward the lower half 31, and thereby yieldingly to place pieces 39 under compression. These pieces can be made from felt, and are arranged at each side of the standard as shown in Fig. 3, in grooves formed in the side walls of the members 31 and 38. In this way, a dust proof casing is provided in which arm 14 is slidable. The provisions for resiliently urging the top 38 downward against the bottom portion 31 includes, in the present instance, a series of studs or screws 40, two on each side of the standard, which are fastened into the bosses 41 in the lower part 31 of the standard. These screws or studs project through apertures in bosses 42 formed on the top half 38. On top of these bosses, compression springs 43 are confined between the heads of the screws 40 and the top surface of the bosses, in order to exert a downward force upon the top 38.

As shown most clearly in Fig. 6, the bosses 42 have a sliding fit over complementary surfaces provided on the bosses 44, integral with the lower portion 31. In this way, up and down movement of the top portion 38 is guided for a straight motion.

Figure 4:
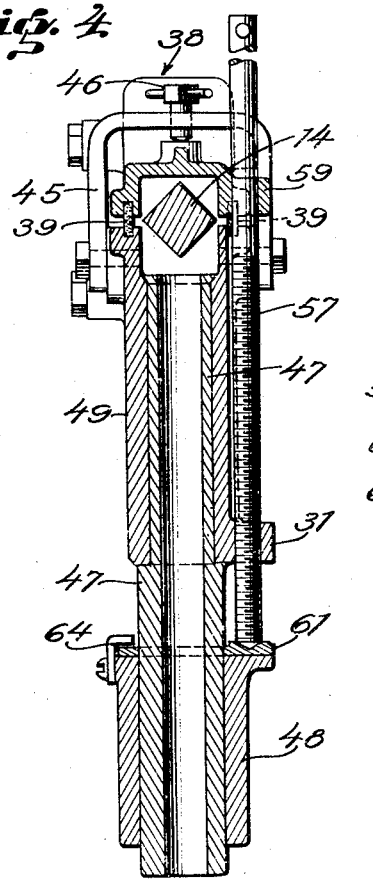
Fig. 4 is a sectional view taken generally along the central plane of the radial arm support, the screw for vertical adjustment of the arm being shortened to reduce the size of the figure.
Figure 5:
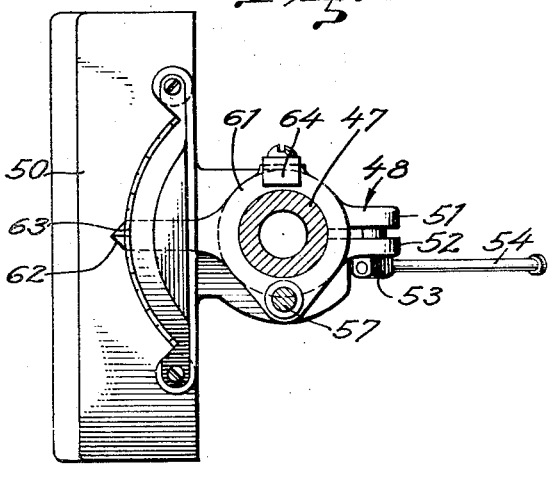
Fig. 5 is a detail section taken along plane 5—5 of Fig. 2.

Portion 31 has a central socket 49 in which a post 47 is fixed. Post 47 has a lower enlarged portion rotatably supported in a socket 48 (Figs. 2, 4 and 5). This socket has a pair of jaws 51, 52, which can be urged together by hand screw 53, having a handle 54. The socket 48 also carries, integrally in this instance, one member 50 of a clamp which is arranged to engage the top surface of bench 11. An angle member 55 cooperating with clamp 50 is disposed on the lower surface of bench 11. It serves to hold the socket 48 solidly to the corner of this bench, by the aid of the screws 56 which enter into the lower portion of the socket 48.

I shall now describe how it is possible to raise and lower the standard 31—38 so as to raise and lower the saw 13 with respect to bench 11, whereby the depth of the saw cut can be regulated. A screw 57 is in threaded engagement with a boss 58 arranged near the bottom of the lower part of standard 31. It is also guided in the boss 59 in the upper portion 38 of the standard. It can be rotated as by a hand crank 60. Its lower end is pointed, and finds a seat in plate 61 disposed around the pipe 47, and movable on the top surface of socket 48.

In order to indicate the angular position of arm 14 with respect to the axis of post 47, the plate 61 carries a pointer 62 cooperating with the stationary scale 63 fastened to the top of jaw 54. This scale overlies the pointer 62. As post 47 rotates in socket 48, the plate 61 is rotated also in unison with the post 47. This rotation is due to the engagement of the tip of screw 57 in the depression provided for it in the top surface of plate 61. It is thus possible to adjust the arm 14 to any desired angle. A guide 64 fastened to the side of socket 48 prevents plate 61 from tilting away from the top of the socket. A stop plate 65 is fastened to the end of arm 14 to prevent it from being pulled out of the support 31—38.

It is apparent that the saw support can be conveniently and quickly adjusted, either in height or angular position. When it is desired to make cross cuts, pipe 47 is rotated to bring arm 14 at right angles to the bench 11. The clamping bolt 46 is left untightened, while clamp jaws 51, 52 are compressed by screw 53 to retain the standard in proper angular position. The height of the saw can be adjusted by rotating screw 57 by the aid of handle 60. Since screw 57 is fixed in the socket on plate 61, rotating the screw thus must serve to move the stand 31—38 up or down on this screw, thus adjusting the height of saw 13 as regards the bench 11.

By moving the arm 14 back and forth between rollers 32, 33, the saw can be operated to cut crosswise of the bench. Since the arm 14 is guided between rollers, the reciprocation of the arm is facilitated. Furthermore, the guiding standard 31—38 is remote from the saw structure itself, where it cannot hinder the free manipulation of the saw. It can thus be well made to support the arm 14 sturdily, there being no considerations to cramp or reduce the size of the supporting elements.

For rip sawing, the saw sector 18 can be turned with respect to standard 24 so as to place the plane of saw 13 perpendicular to arm 14, which remains perpendicular to bench 11. Thus the plane of saw 13 parallels the longitudinal edge of bench 11. For bias cuts, the saw 13 can be in the position shown, and the cuts produced by moving arm 14 axially in the standard 31—38.

I claim:

1. In a supporting structure for portable power saws, a vertical standard, rollers in said standard, and a radial arm of polygonal cross section slidable between the rollers, said rollers having opposed grooved faces accommodating the edges of the arm, and closely embracing the sides thereof whereby lateral and vertical movement between the arm and rollers is eliminated.

2. In a supporting structure for portable power saws, a vertical standard having an upper and a lower portion, a pair of rollers in each of said portions, the rollers in each pair being spaced widely apart in a horizontal direction and cooperating with the rollers in the other portion to define a polygonal space between them, and a radial arm fitting into said space and slidable on the rollers, said cooperating rollers closely embracing the sides of the arm whereby lateral and vertical movement between the arm and rollers is eliminated.

3. In a supporting structure for portable power saws, a vertical standard having an upper and a lower portion, a radial arm guided in the standard for horizontal axial movement, means resiliently urging the two portions together, and a yielding member disposed between the congruent surfaces of the two portions to provide a dust proof space between the two portions.

4. The combination as set forth in claim 3, in which the upper and lower portions of the standard each have edges with grooves therein to accommodate the yielding member, which is the form of a strip.

5. In a supporting structure for portable power saws, a standard, means forming a socket for the standard, a screw for raising and lowering the standard, and a plate on the socket which holds the end of the screw at a position remote from the axis of the standard, said plate being rotatable on the axis of the standard, whereby when the standard is angularly adjusted in the socket, the plate is moved by the screw with the standard and can serve to indicate the relative angular positions of the standard.

6. In a supporting structure for portable power saws, a vertical standard having an upper and a lower portion, a radial arm guided in the standard for horizontal axial movement, means resiliently urging the two portions together, said means comprising compressed springs, and a yielding material disposed between the congruent surfaces of the two portions to provide a dust proof space between the two portions.

In testimony whereof I have hereunto set my hand.

THERON L. HEDGPETH.